Figure 1:
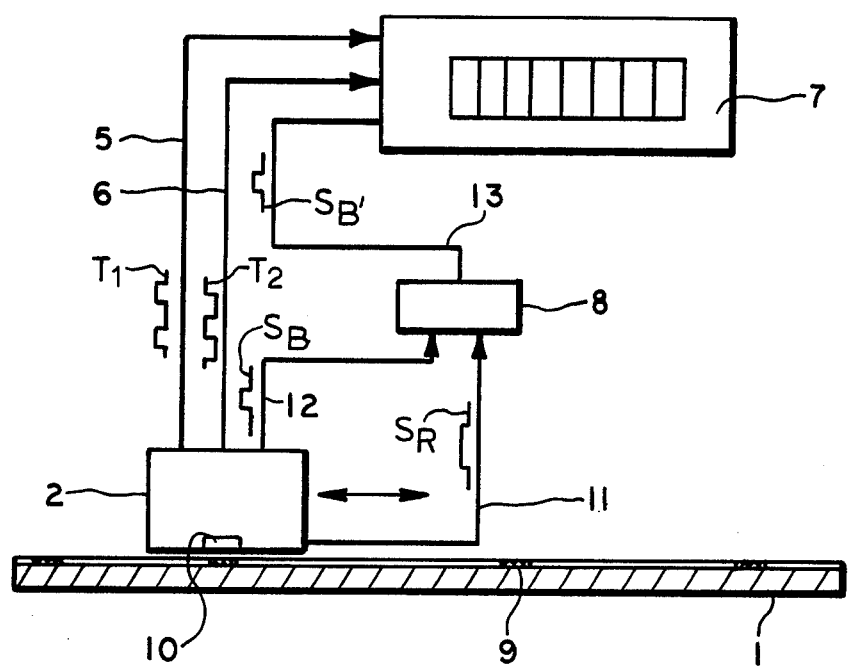

United States Patent [19]
Nelle

[11] 4,101,764
[45] Jul. 18, 1978

[54] INCREMENTAL MEASURING SYSTEM

[75] Inventor: Günther Nelle, Siegsdorf, Fed. Rep. of Germany

[73] Assignee: Dr. Johannes Heidenhain GmbH, Traunreut, Fed. Rep. of Germany

[21] Appl. No.: 719,847

[22] Filed: Sep. 2, 1976

[30] Foreign Application Priority Data

Sep. 11, 1975 [DE] Fed. Rep. of Germany ....... 2540412

[51] Int. Cl.² .............................................. H01J 3/14
[52] U.S. Cl. ........................... 250/237 G; 235/92 GC; 250/231 R
[58] Field of Search .......................... 250/237 G, 231; 235/92 GC, 92 V, 92 A; 324/34 D, 34 PS; 340/347 P

[56] References Cited

U.S. PATENT DOCUMENTS

| | | | |
|---|---|---|---|
| 3,024,986 | 3/1962 | Strianese et al. | 235/92 GC |
| 3,142,121 | 7/1964 | Stefanov | 235/92 GC X |
| 3,591,841 | 7/1971 | Heitmann | 250/231 R |
| 3,663,803 | 5/1972 | Mohan et al. | 235/92 V |
| 3,982,106 | 9/1976 | Stutz | 235/92 GC |
| 4,012,623 | 3/1977 | Fleisher | 235/92 A |

Primary Examiner—David C. Nelms
Assistant Examiner—Vincent J. Sunderdick
Attorney, Agent, or Firm—Hume, Clement, Brinks, Willian & Olds, Ltd.

[57] ABSTRACT

An incremental measuring instrument having a series of fixed reference marks along one edge of the grid scale is disclosed in which a series of movable magnets are located along the opposite edge of the grid scale so that a magnet may be associated with each reference mark which is needed for control purposes in the particular application in which the system is being used. The magnets are movably mounted so that reference marks not needed for control purposes in any specific application do not have magnets associated with them. An electric switch, preferably a magnetically actuated Reed switch, is also provided in the system's sensor head. Electrical impulses generated by the magnets and the switch are transmitted to an electronic comparator along with electric impulses generated when the sensor head passes over the reference marks. This electronic comparator is connected to the system's electronic control counter and its logic circuitry is such that a reference mark impulse is only transmitted to the control counter when an impulse is simultaneously fed to the comparator by the switch associated with the magnets.

7 Claims, 2 Drawing Figures

INCREMENTAL MEASURING SYSTEM

This invention relates to an incremental measuring system having a series of fixed reference marks provided along the grid scale. The position of these reference marks is determined absolutely at the time of producton of the graduation scale, as the reference marks are built into the scale at that time. Reproducible electronic impulses are generated at these reference marks in conjunction with the photoelectric sensor means of the system to operate certain control elements or processes in the electronic counter provided with the system. These control impulses may be utilized in various ways, for example, for the reproduction of the zero position in the counter, for encountering a certain position at the start of the reading, or for checking with regard to interfering impulses.

In the incremental measuring systems known in prior art, the number and position of the reference marks applied to the grid scale at the time of its production are determined in accordance with the user's initial requirements for the system. Consequently, at a later time and later application of the measuring system, it is no longer possible to modify the number or the position of the reference marks or the control impulses produced thereby.

The present invention is therefore directed to overcoming this limitation in the versatility of reference mark type measuring systems by providing a means whereby only specific references marks, of all those provided along the grid scale, may be selected which can generate impulses which will ultimately activate or control the electronic counter. Accordingly, the present invention is directed to a reference mark type measuring system which has switch means, preferably of the electrical kind, which cooperate with a set of movable selection indicators along the grid scale which cause only the fixed reference marks needed for the particular measuring system application to generate control impulses which can activate the electronic counter.

In one preferred embodiment of the invention, a magnet is associated with each reference mark which is to operate during the measuring process. As the photoelectric sensor head in the measuring instrument is moved over these magnets, the magnets activate an electric switch mounted on the sensor head. The electrical output of this switch, along with the electrical output of the sensor head generated by the coaction of the photoelectric sensor with the reference marks, is transmitted to an electronic component which is so designed that a control impulse is only furnished at its output and fed to the system's electronic counter if an electrical signal occurs simultaneously at the output of the sensor head and at the output of the switch. Thus, every time the sensor head passes over a reference mark which does not have a magnet associated with it, an electrical signal only occurs at the output of the sensor head and the electronic component does not furnish an impulse at its output and does not feed a control impulse to the system's electronic counter.

The magnet utilized in this invention may be either a permanent magnet or an electromagnet. These magnets advantageously are displaceably arranged along the measuring grid scale so that they can easily be associated with the reference marks needed for a particular application. Preferably, the switch provided on the sensor head which cooperates with the magnets is a Reed switch of known design.

Additional features and advantages of the present invention are described in, and will appear from, the description of the preferred embodiments which follow and from the drawing which schematically represents an embodiment of the invention and to which reference is now made.

FIG. 1 schematically represents a measuring system according to the invention.

Figure 2:
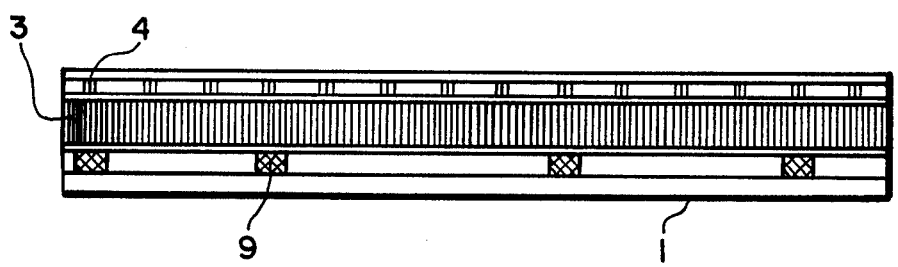

FIG. 2 shows a top view of the grid scale used in the measuring system of this invention.

The embodiment illustrated in the drawing represents a photoelectric incremental measuring system comprising a metal grid scale 1 and a sensor head 2 incorporating a photoelectric sensor element. The line grating 3 on grid scale 1 (FIG. 2) is scanned photoelectrically and azimuthally by the sensor element without contact between the line grating and the sensor head. A series of reference marks 40 are provided along one edge of the line grating 3. Each of these reference marks consists of individual divisional groups, a group of lines separated from each other by finite spaces. An electrical signal is generated at these groups when an equivalent divisional group located in sensor head 2 passes over them, said signal experiencing a substantially more steep modification of its size proximal to a certain positional association of said division groups than in other positional associations. Reference marks of this kind are known and are described, for example, in the U.S. Pat. No. 3,591,842.

The electrical signals generated at the line gratings 3 are converted into rectangular signals $T_1/T_2$, are amplified in sensor head 2, and are fed to an electronic counter 7 via electrical conduits 5, 6 to control that counter, which provides readings in digital form. The electrical signal generated at reference marks 4 is also amplified in the sensor head 2 and is converted into a rectangular signal $S_B$. Incremental measuring systems with reference marks are known and are described, for example, in pamphlet "LIDA 55.12" of the firm Dr. Johannes Heidenhain, Traunreut, West Germany, particularly in FIG. 2, of the 2nd edition, dated March, 1971.

The selection of the specific reference marks 4 which are to become operative during the measuring process is made by means of individual magnets 9 which are located along the other side of grid scale 1. One such magnet 9 is associated with each reference mark 4 which is to become operative. These magnets 9 are adjustable along the edge of grid scale 1 so that they can readily be placed across from the appropriate reference marks. A Reed switch 10 is mounted at one end of the sensor head 2 so that the switch 10 passes over the series of magnets 9 as the sensor head 2 moves along the grid scale 1 and the line gratings 3. When the sensor head 2 and the Reed switch 10 pass over a magnet 9, the switch generates a signal $S_R$. The electrical outlet 11 of Reed switch 10 and the electifical outlet 12 of the reference mark generated signal from the sensor head 2 are connected to an electronic component 8. Thus, $S_B$ signals from the reference marks and $S_R$ signals from the magnets are furnished to electronic component 8 via outlets 12 and 11, respectively. This component's logic is so organized that a signal $S_B$ occurs at its electrical outlet 13 only if electrical signals $S_B$ and $S_R$ are simultaneously fed to the component. The outlet 13 of electronic component 8 is connected to electronic counter 7 which is controlled upon the occurrence of an impulse $S_B$ at outlet 13, and is, for example, set to zero when such an impulse occurs.

The invention is not restricted to the embodiment shown, but naturally other embodiments come within the scope of the invention. For example, with encapsulated incremental measuring systems, such as the type disclosed in Germany Gebrauchsmuster 7,504,025, the magnets may be placed in the hollow body screening the grid scale against environmental influences.

In another embodiment of this invention, an electrical switch, preferably a Reed switch, is connected in series directly to the electrical converter in the sensor head associated with the reference marks, such as a photoelectric element. In this embodiment, the electrical switch only becomes closed under the effect of the magnetic field generated by the individual magnets, and, as a result, the electrical converter for the reference marks only becomes operative, and can only generate or transmit a $S_B$ signal to counter 7, when it is over a reference mark which has a magnet associated with it. At all other times, even when over other reference marks, the electrical converter is inoperative and cannot generate or transmit a control signal to counter 7.

The embodiments described herein are intended to be exemplary of the types of reference mark type incremental measuring systems which fall within the scope of the invention. However, one skilled in the art would certainly be expected to be able to make modifications and variations of these embodiments without departing from the spirit and scope of the invention as it is defined in the following claims.

What is claimed is:

1. In an incremental measuring system, including a grid scale, an electronic counter, a plurality of fixed reference marks along the grid scale, and a movable sensor means for generating an electric impulse in conjunction with the reference marks for control purpose use by the electronic counter, the improvement comprising a series of movable selection indicators adjustable along the grid scale for association with each of the fixed reference marks needed for control purposes, and a switch means for cooperating with the adjustable selection indicators to prevent electric impulses generated by the sensor means, in conjunction with reference marks not associated with a selection indicator, from reaching the electronic counter.

2. The incremental measuring system of claim 1, wherein the movable selection indicators are magnets, and wherein the switch means comprises an electrical switch, mounted on the sensor means, for generating an electric impulse in conjunction with a magnet, and an electronic component connected to the electronic counter and to which the impulses generated in conjunction with both the reference marks and the magnets are fed, said electronic component being provided with logic which only permits an impulse from the reference marks to be fed to the electronic counter when an impulse from a magnet is simultaneously fed to the electronic component.

3. The incremental measuring system of claim 1, wherein the movable selection indicators are magnets, and wherein the switch means comprises an electrical switch mounted on and connected in series with the sensor means, the switch cooperating with the magnets to prevent an impulse from being transmitted from the sensor means to the electronic counter unless an impulse is simultaneously generated by the switch in conjunction with a magnet.

4. The incremental measuring system of claim 2, wherein the switch means is a magnetically actuated Reed switch.

5. An incremental measuring system, comprising:
a grid scale;
a movable sensor head;
a first sensor means in the sensor head for generating an impulse in conjunction with the grid scale;
an electronic counter connected to the first sensor means to receive the impulses from the first sensor means;
a series of reference marks located in fixed positions along the grid scale;
a second sensor means in the sensor head for generating a control impulse for the electronic counter in conjunction with a reference mark;
a plurality of magnets adjustably located along the grid scale for association with only those reference marks which are to operate during the measuring operation and which are needed for control purposes;
a switch means in the sensor head for generating an impulse in conjunction a magnet; and
an electronic component electrically connected to both the second sensor means and the switch means for receiving the impulses generated therein, said component having its electrical output electrically connected to the electronic counter, said component being provided with logic which permits an impulse from the second sensor means to be transmitted to the electronic counter only if an impulse from the switch means is received by the component at the same time the impulse is received from the second sensor means so that, as the sensor head moves along the grid scale, impulses from only those reference marks needed for control purposes, and which have a magnet associated with them, will be transmitted to the electronic counter and effect its operation.

6. The incremental measuring system of claim 5, wherein the switch means is a magnetically actuated Reed switch.

7. The incremental measuring system of claim 5, further comprising an elongated hollow body for enclosing the scale and the sensor head for protection against environmental influences.

* * * * *

UNITED STATES PATENT AND TRADEMARK OFFICE
CERTIFICATE OF CORRECTION

PATENT NO. : 4,101,764
DATED : July 18, 1978
INVENTOR(S) : Gunther Nelle

It is certified that error appears in the above-identified patent and that said Letters Patent are hereby corrected as shown below:

Col. 2, line 59 — "Electifical" should read --electrical--

Col. 4, line 34 — Add the word --with-- after the word "conjunction".

Col. 4, line 50 — "effect" should read --affect--.

Signed and Sealed this

Twenty-fourth Day of April 1979

[SEAL]

Attest:

RUTH C. MASON
Attesting Officer

DONALD W. BANNER
Commissioner of Patents and Trademarks